Sept. 18, 1951 J. H. FRIEDMAN 2,568,440
COMPOSITE DIE FOR NUT MACHINES
Filed Sept. 9, 1948
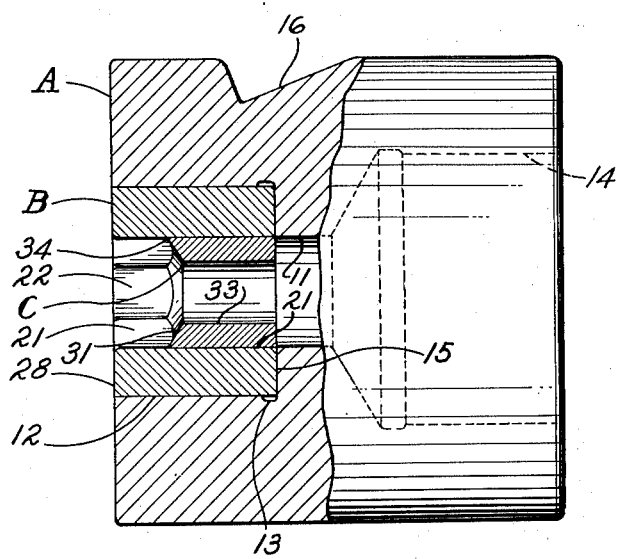
Fig. 1
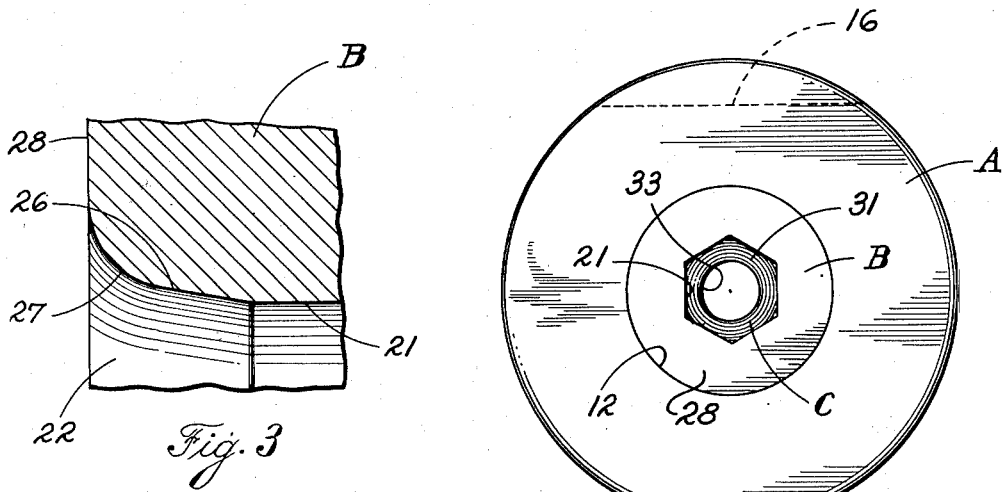
Fig. 3
Fig. 2
INVENTOR.
JOHN H. FRIEDMAN
BY Richey & Watts
ATTORNEYS Patented Sept. 18, 1951

2,568,440

UNITED STATES PATENT OFFICE 2,568,440

COMPOSITE DIE FOR NUT MACHINES

John H. Friedman, Tiffin, Ohio, assignor to The National Machinery Company, Tiffin, Ohio, a corporation of Ohio Application September 9, 1948, Serial No. 48,400

3 Claims. (Cl. 10—85)

This invention relates to dies for use in heading or upsetting machines and particularly to a composite die for cold-heading nut blanks and articles of similar nature.

Dies containing recesses in which metal is caused to flow by upsetting and similar metal working operations must withstand high compressive forces and transmit the same to the die bed or other supporting structure of the machine, since the deforming pressure applied to the metal is transmitted like hydrostatic pressure to the confining surfaces. At the same time the dies are subjected to wear and erosion both during the removal of the finished piece, which must be freed from the walls of the die by a knock-out pin or the like, and from any flow of the metal with respect to a die surface during the forming operation.

The most suitable materials for the die surfaces subjected to metal flow are the extremely hard tool materials, such as cemented carbide, hardened non-deforming tool steel, and the like. However, the high hardness of such materials is accompanied by limited ductility, so that breakage may occur within the elastic deformation of the metal of the frame or other die supporting part of the machine under the hydrostatic pressure of upsetting. Such materials are also costly and difficult to machine, so that it is not economical to make an entire die of extremely hard material of sufficient cross-section to withstand the upsetting loads.

The principal object of the present invention is to reduce the cost of upsetting operations by increasing the useful life of the dies, particularly dies subjected both to metal flow against a die surface and to hydrostatic upsetting pressures. Other objects are to minimize the cost of the materials of the die and the cost of the die sinking or forming operations.

I have discovered that a composite die capable of withstanding the high compressive forces applied thereto by the hydrostatic pressure of upsetting and also capable of withstanding, through a long period of service, the wear and erosion of metal flow, may be constructed of an inner portion of high hardness material providing a wear resistant face, and a portion of relatively tough material receiving the principal upsetting forces which is maintained under initial compression so as to prevent breaking of the high hardness portion by excessive stretching or yielding of the remainder of the die. I have also discovered that such dies can be constructed with a minimum material cost and with a substantial saving in the cost of fabricating the die.

Examples of one-piece dies, and of the character of operations for which both one-piece dies and the composite die which forms the subject of the present application are used, are disclosed in my copending applications for "Method and Apparatus for Making Nuts," Serial No. 547,849, filed August 3, 1944, issued on February 20, 1951, as Patent Number 2,542,022, and for "Machine for Making Nuts," Serial No. 663,569, filed April 19, 1946, issued on February 20, 1951, as Patent Number 2,542,864.

The manner in which the principal objects of the invention are realized, and various other objects more or less ancillary in nature, will be apparent to those skilled in the art from the description herein of the preferred embodiment of the invention which is illustrated in the appended drawings of which:

Fig. 1 is a longitudinal view, partly in axial section, of a composite die;

Fig. 2 is an end view of the same; and

Fig. 3 is a detail, greatly enlarged.

The die disclosed herein is adapted for use in heading and upsetting machines generally, and may relace previously known one-piece dies in such machines; and it is therefore considered unnecessary to disclose herein the heading machine or such elements as punches, knockouts, and the like used with the die. A full disclosure of such matters may be found in the above-mentioned Friedman applications and in the patents to Clouse, No. 2,026,823 and Frayer, No. 2,100,028. It is to be understood that the die of this invention is adapted for use in machines of various types and is not restricted to use in the above-mentioned machines, which are cited purely as examples of environments in which the invention may be used.

In the preferred embodiment, the composite die is composed of three parts which may be identified as a die holder A, composed of material of high ductility and toughness, such as a nickel-chromium die steel, a die B, composed of relatively tougher material such as high speed tool steel, and a die insert C composed of extra good wearing material, such as cemented carbide, hardened non-deforming tool steel, or other good material. The die holder comprises a preferably cylindrical body drilled along its axis to form a central bore 11 and bored out to a larger diameter at the front of the die to form a recess 12 for the die B, the bore 12 being relieved at the inner end thereof as illustrated at 13. The rear end of the die holder A is bored out to provide a cavity 14 which may accommodate a knockout pin and a bushing therefor (not shown). The bore 12 is preferably a right circular cylinder and the shoulder 15 at the bottom thereof is preferably radial. A notch 16 in the outer surface of the die holder or other conventional arrangements may be provided for cooperation with means for retaining the die holder in the die block of the heading machine.

The die B, in its external outline, is substantially a right circular cylinder, although it may be slightly tapered, and is dimensioned for a press fit into the cavity 12 of the die holder. The die B is formed with an internal opening 21 which, as illustrated, is of the form of a hexagonal prism extending from one end to the other of the die. The hexahedral form illustrated is for a hexagon nut, and, of course, the opening 21 may be of other forms for other operations. The die cavity 22 is defined by the walls of the opening 21 and the face 31 of the die insert C.

This die insert is formed with a prismatic exterior adapted to fit within the prismatic opening 21 of the die, with a face 31 which may be concavely dished as illustrated, or of other forms depending upon the function of the die, and with a central bore or passage 33 for a knockout pin or the like. It is to be noted that the die insert C does not necessarily abut the die holder A since the bore 11 may be of greater radius than the die insert. In this case the insert C is backed up by a bushing or the like around the knockout pin. It will be understood that in use the entire die including the insert, is solidly backed up by the bed frame of the machine in which the die is used.

The illustrated die is arranged to form a dished or chamfered face on the hexagonal nut blank or the like being formed in the die. Such a die form is extremely difficult to shape in a solid piece of die steel, particularly in material of sufficient hardness to give satisfactory die life. While the desired shape may be readily produced by the use of the insert C in the hexagonal hole 22 of the die B, the intersection of the dished face 31 with the hexagonal outer surface of the insert produces thin, unsupported points 34 at each corner of the insert. In order to prevent these points from being broken off during upsetting, it is necessary to prevent excessive outward yielding of the die B under the hydrostatic pressure of upsetting. At the same time, the die B cannot be pre-loaded to such an extent as to break off the points 34 during assembly or when the upsetting pressures are relieved and the blank is ejected in use. These problems are solved by the present invention by a proper distribution of elastic stresses in the parts of the die.

The mouth of the die cavity 22 is preferably slightly chamfered as illustrated in Fig. 3, which is an enlarged view, the scale being approximately twenty times the scale of Figs. 1 and 2. As shown, the entrance portion of the cavity 21 is tapered at 26 at an angle of about 10° to the axis of the die and the junction of the tapered surface 26 with the outer face of the die radiused as indicated at 27. This construction facilitates the assembly of the die according to the present invention.

In the fabrication of the die assembly, the several parts are separately machined or ground, after which the die insert C is assembled in the die B. The die insert is preferably dimensioned for a tapped fit within the die. In a die approximately of the size and proportions illustrated in the drawings, the diameter across the flats of the die insert C may be approximately three thousandths of an inch greater than the diameter of the opening 21 in the die. With this relation the insert may be driven into the die by relatively light tapping, without danger of scoring the die or damaging the sharp edges 34 of the die insert. This assembly of the insert in the die puts the insert C under some compression, and the die B under equivalent tension. Alternatively, the dimensions of the insert C may be the same as, or slightly smaller than, the corresponding dimensions of the opening 21.

The size of the opening in the die will of course depend upon the size of the nut or other article to be formed. The over-all diameter of the die B is preferably of the order of twice the diameter of the die cavity. The greatest outside diameter of the die B with the insert assembled therein is sufficiently greater than the diameter of the cavity 12 of the die holder to produce a press fit between these parts. In a die of about the size and proportions illustrated, this is accomplished by making the outer end of the die B, before the insert is assembled therein, about six or seven thousandths of an inch larger in diameter than the opening 12. If the die B is tapered, the inner end thereof may exceed the diameter of the opening 12 by a lesser amount, or the inner end of the die B may be otherwise formed to facilitate driving the die into the opening 12. The die B carrying the insert C, after being aligned with the opening 12, may be forced into the position illustrated in Fig. 1 by a press or the like. This operation changes the stress in the metal of the die B from a state of light tension to a state of relatively heavy compression, and puts the metal of the holder A in tension. A part of the force is transmitted to the insert C, increasing the compression in the insert and the remainder is taken by compression of the metal of the die B. Thus the amount of radial yielding of the walls of the die B under the hydrostatic pressure of upsetting is reduced by the pre-loading of the die and the corners 34 of the insert C remain firmly supported by the die B.

While the parts of the die may be constructed of various materials to suit different requirements in use I have found that the best results for the illustrated die are obtained by making the die holder A of a material such as nickel chrome die steel, the die B of a high speed tool steel and the insert C of cemented carbide or hardened non-deforming tool steel. A suitable material for the die holder has been found to be SAE steel No. 3150 which contains about 1% to 1.5% nickel, .45% to .75% chrome and .45% to .55% carbon. A suitable material for the die B is any of the various high speed tool steels containing for example .80% carbon, 12% to 20% tungsten, 2.5% to 5% chrome, and .5% to 2.25% vanadium with or without other alloying elements. A suitable non-deforming steel for the insert C, which may be used in place of cemented carbide, may contain about .90% to .95% carbon, 1% to 1.50% manganese, .5% chrome, .5% tungsten, and .10% to .25% vanadium.

Pressing of the die B into the holder A is facilitated by the formation of a very slight taper on the outer surface of the die. In the die illustrated, the taper of the die is about five thousandths of an inch, and the inner end is about one or two thousandths of an inch larger than the bore 12 of the die holder. It will be understood that the values of clearances stated herein are those which are believed to be best for the die disclosed herein and that variations in the values might be desirable in accordance with changes in the size of the die.

The central passage 21 of the die has been described as prismatic. Preferably, the portion of this bore in which the die insert C is lodged is without taper, but it may be of any desired cross-section such as polygonal or circular, to accord with the cross-section of the die cavity 22. The outer portion of the passage 21, which forms the die cavity 22 may be either straight or tapered, depending upon the desired shape of the die cavity.

It will be seen that the composite die structure illustrated herein is very simple to fabricate. The use of the insert C eliminates the difficulty of machining the conical surface 31. It is a relatively simple matter to machine all the parts of the die as will be apparent, and the assembling of the several parts is a simple operation. No great force is required to mount the die insert in the die, and thus there is no likelihood of damaging these parts. In pressing the die into the die holder, a greater force is required, but the ram may bear against the plane outer surface 28 of the die.

It should be noted that while pressing is regarded as the most practical method of assembling the die, the desired relative loading effect of the several members depends upon the dimensions of the parts, and may be secured, for example, by a method of assembly utilizing differential heating of the members rather than by pressing them into place. The compression of the die and the die insert, which together form the active part of the die, by the massive die holder reinforces these parts and decreases the possibility of failure of the die. The individual parts may be of different materials selected for economy and ease of machining as well as for the best mechanical characteristics. For these reasons a stronger die may be produced than in the one-piece construction, and the materials for the composite die are less expensive.

Although preferred embodiments of the invention have been described in considerable detail, it is to be understood that various modifications and rearrangements of the parts may be resorted to without departing from the scope of the invention as defined in the following claims.

What is claimed is:

1. In combination a steel heading die having a polygonal die cavity extending into said die from the front face thereof, a die insert having a polygonal exterior surface similar to, but normally larger in dimensions than, said die cavity positioned in said die cavity and spaced from the front face of said die, said insert being formed of material harder than said die and having a concave front face forming a wall portion of said die cavity, the intersection of the polygonal exterior surface and the concave front face of said insert forming projecting corner portions closely engaging and supported by the walls of the die cavity of said die.

2. In combination a steel heading die having a polygonal die cavity extending into said die from the front face thereof, a die insert having a polygonal exterior surface fitting closely in said die cavity and spaced from the front face of said die, said insert being formed of material harder than said die and having a concave front face forming a wall portion of said die cavity, the intersection of the polygonal exterior surface and the concave front face of said insert forming projecting corner portions closely engaging and supported by the walls of the die cavity of said die, and a steel die holder having an opening extending into said holder from the front face thereof with an interior surface similar to, but normally smaller in dimensions than, the exterior surface of said die, said die being positioned in said opening.

3. A die assembly for upsetting and forging metal articles comprising a die body having a polygonal die cavity extending therein from the front face thereof, a die insert having a polygonal exterior surface fitting closely in said die cavity and spaced from the front face of said die body, said insert having a concave front face forming a wall portion of said die cavity, the intersection of the polygonal exterior surface and the concave front face of said insert forming projecting corner portions closely engaging and supported by the walls of the die cavity of said die body, and a die holder having an opening extending into said holder from the front face thereof with an interior surface similar to, but normally smaller in dimensions than, the exterior surface of said die body, said die body being positioned in said opening.

JOHN H. FRIEDMAN.

REFERENCES CITED

The following references are of record in the file of this patent:

UNITED STATES PATENTS

| Number | Name | Date |
| --- | --- | --- |
| 329,801 | Allerdice | Nov. 3, 1885 |
| 1,395,217 | Begot | Oct. 25, 1921 |
| 1,896,674 | Longwell | Feb. 7, 1933 |
| 1,935,821 | Simons | Nov. 21, 1933 |
| 2,044,986 | Horton | June 23, 1936 |
| 2,146,995 | Simons | Feb. 14, 1939 |
| 2,147,888 | Gaines | Feb. 21, 1939 |
| 2,164,750 | Nadler | July 4, 1939 |
| 2,350,465 | Keshian | June 6, 1944 |